Aug. 5, 1952                H. J. MODREY               2,606,224
ELECTRICAL COUPLING FOR DETACHABLY
CONNECTING CONDUCTOR ENDS
Filed April 21, 1948                              2 SHEETS—SHEET 1
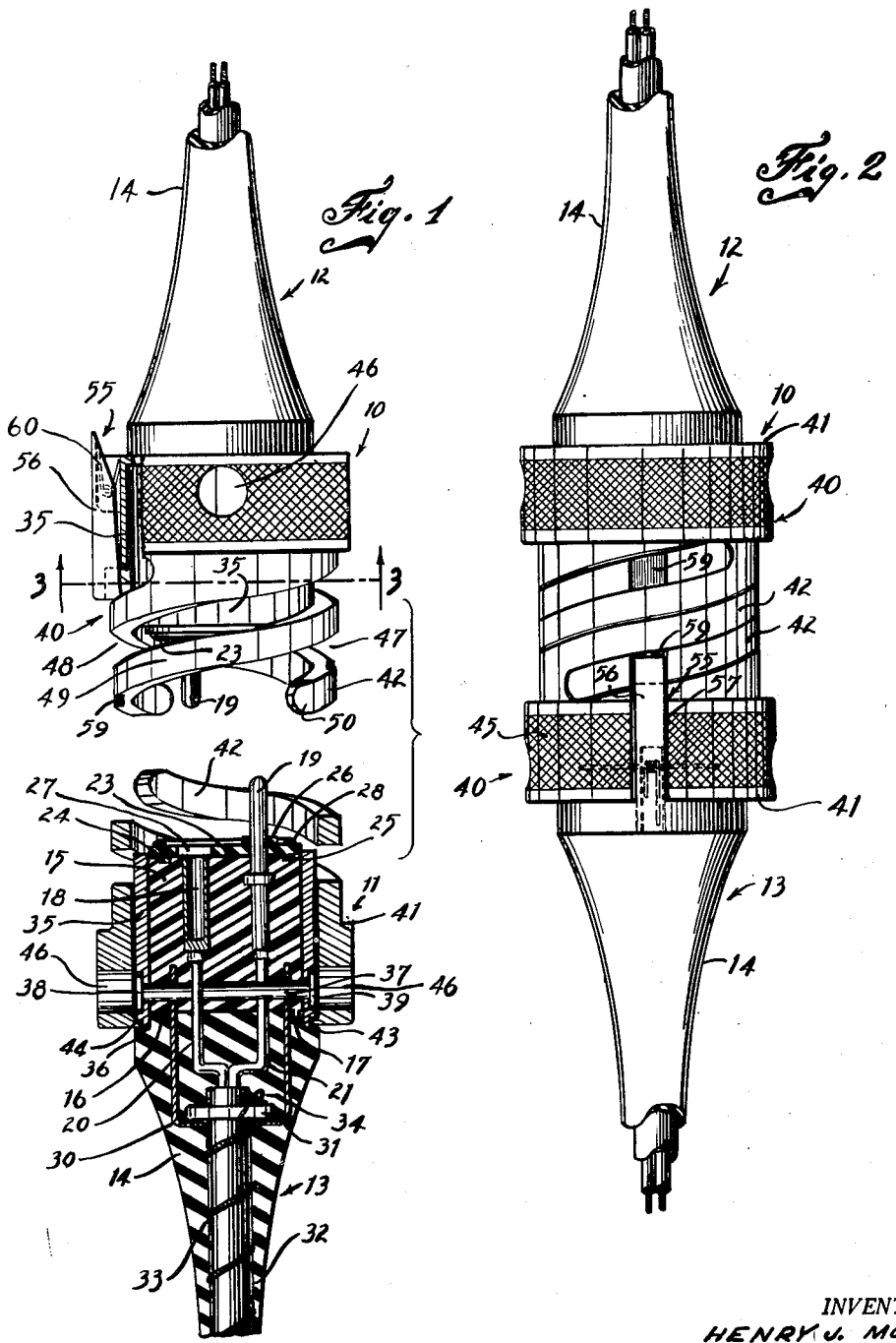
INVENTOR.
HENRY J. MODREY
BY
ATTORNEY

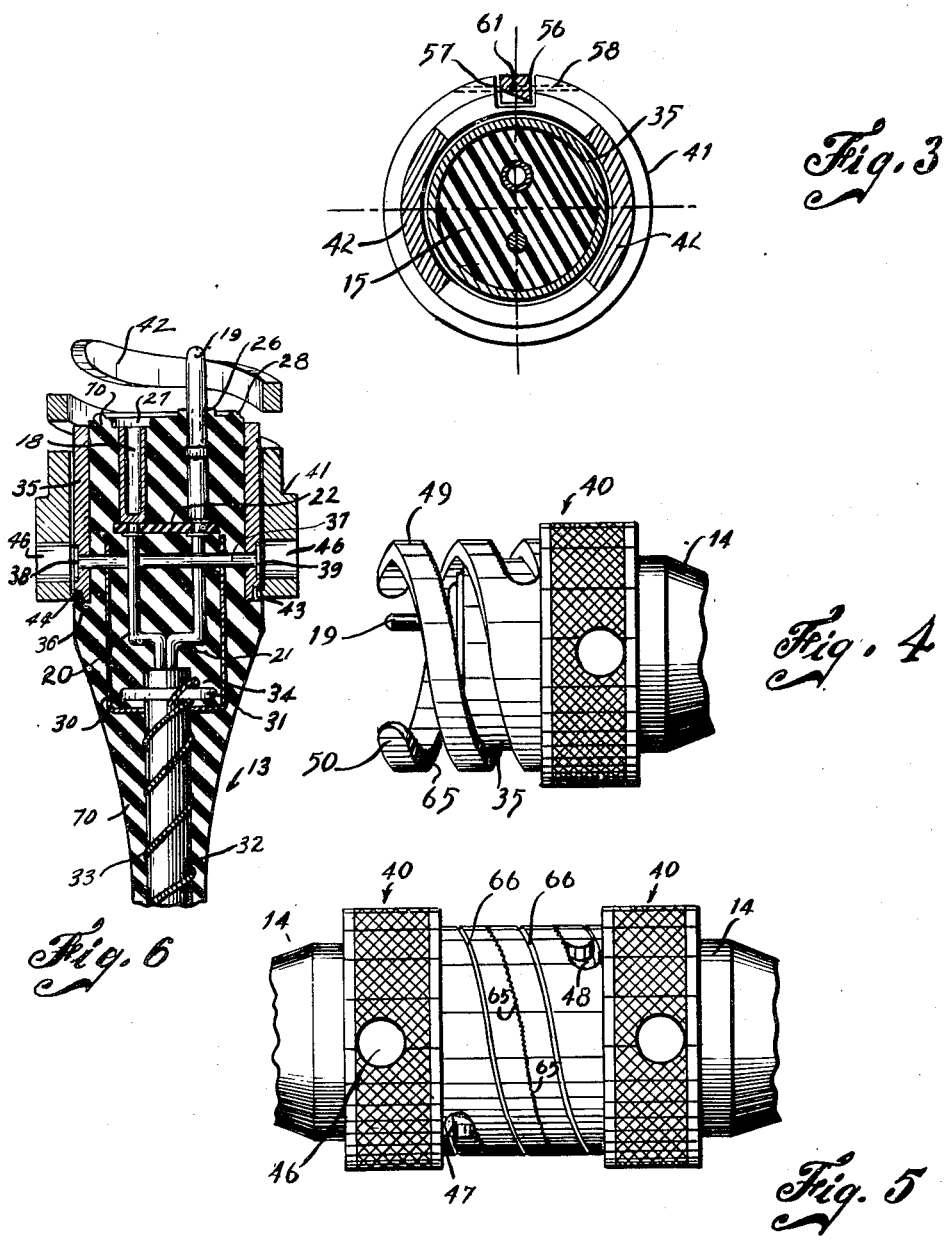

Patented Aug. 5, 1952

2,606,224

UNITED STATES PATENT OFFICE 2,606,224

ELECTRICAL COUPLING FOR DETACHABLY CONNECTING CONDUCTOR ENDS

Henry J. Modrey, Newark, N. J.

Application April 21, 1948, Serial No. 22,303

11 Claims. (Cl. 173—328)

This invention relates to electrical couplings as are used for detachably connecting two conductors or cables.

Conventional electrical couplings of the general type, above referred to, comprise two connector members, one usually referred to as plug or male member and the other as socket or female member.

As will be obvious, the two members of such coupling are inherently of different or unsymmetrical design and it will further be obvious that two conductor or cable ends cannot be connected with each other unless one conductor ends in a plug or male member and the other in a socket or female member.

As a result, difficulties and inconveniences arise in certain instances when conductor or cable sections of considerable length are to be connected to form a continuous cable. Such cable sections of considerable length and frequently of substantial weight are usually stored and transported on cable drums from which the cable sections are unrolled as needed and then laid out. When it is found that the connector members on two cables ends to be connected do not match, one cable section must be rewound and reversed or special intermediate couplings or joints must be employed. The rewinding and relaying of a long and heavy cable section are inconvenient and time consuming and in certain conditions it may also be dangerous, for instance when the cable is to be laid by the armed forces in times of war and under fire. The use of intermediate couplings, while obviating reversing of a cable section, requires additional equipment and practical experience shows that such intermediate couplings are not always available when needed.

Accordingly, it is one of the objects of the invention to provide a novel and improved symmetrical coupling, the connector members of which can be conveniently joined to and separated from each other and are capable of withstanding substantial pull without separating.

Another object of the invention, allied with the preceding one, is to provide a novel and improved symmetrical coupling having a high axial rigidity.

The two last mentioned objects are of great practical importance in that cables of the type here referred to, are frequently pulled over the ground and partly suspended when laid over an obstacle, thereby subjecting the couplings to considerable pulling and bending stresses.

Another object of the invention is to provide a novel and improved symmetrical coupling in which the contact pins of the connector members are fully protected against damage by impact when the connector members are disengaged from each other.

Cables of the general type, above referred to, are principally used outdoors so that the couplings must be protected against the access of duct, moisture, snow, ice and water. Protection of the contact elements of the coupling and of the entire interior of the coupling are particularly important and also particularly difficult when the coupling is used in conection with cables for maritime use and submerged in water, for instance in sea water of substantial depth.

Accordingly, it is still another object of the invention to provide a novel and improved symmetrical coupling the interior of which containing the contact elements and the insulation material is completely and tightly sealed against access or seepage of moisture and water or other liquid even though the water may be under pressure as it is in case of submerged cables.

Another and more specific object of the invention is to provide locking means by which the connector members of the coupling can be locked to each other in sealed position.

Another object of the invention is to provide a coupling the manufacture of which is simpler and less expensive since only one type of connectors need to be manufactured by reason of the symmetrical design of the two connectors of a coupling.

Other and further objects, features and advantages of the invention will be pointed out hereinafer and set forth in the appended claims forming part of the application.

In the accompanying drawing several now preferred embodiments of the invention are shown by way of illustration and not by way of limitation.

In the drawing:

Fig. 1 is a partly sectional view of a coupling according to the invention, the connector members being shown separated.

Fig. 2 is a view of the same coupling as Fig. 1, the connector members being connected to each other.

Fig. 3 is a section along line 3—3 of Fig. 1.

Fig. 4 is a view of a modification of one of the two symmetrical connector members.

Fig. 5 shows two connector members according to Fig. 4 in engagement, and

Fig. 6 is a sectional view of another modification of a coupling connector.

Referring now to the figures in detail, the exemplification of the coupling according to Figs. 1 to 3 inclusive comprises two symmetrical connectors, generally designated by 10 and 11 respectively. Connector 10 is connected to an insulated cable, generally designated by 12 and connector 11 to an insulated cable, generally designated by 13. Each cable is shown as a two-wire cable. However, it will be obvious that couplings according to the invention can also be applied to cables having any even number of wires. The end of each cable, say of cable 13 is provided with a substantially cone-shaped sleeve 14 made of rubber or any other suitable insulation material. Connector 11 is seated upon the flat face of sleeve 14. The connector comprises a substantially cylindrical insulation member 15. This insulation member may be made of any suitable material which has high electric resistance properties, is resistant to changes in temperature within a wide range, has a low coefficient of shrinkage and is long lasting. Insulation material combining these properties is generally found among the solid and rigid materials; various plastics are known in the art satisfying all requirements. To secure member 15 in its position relative to sleeve 14 an annular groove 16 is provided in the face of sleeve 14 which groove is engaged by a corresponding annular ring 17 extending from member 15.

The insulation member encases the contact elements of the connector. These contact elements are shown as a socket 18 and as a plug or pin 19 protruding from the forward end of insulation member 15. In other words, each connector is provided with an engaging and a receiving contact element. As can best be seen in Fig. 1, wire 20 of cable 13 is connected to socket 18 and wire 21 to pin 19.

The end of the rigid insulation member 15 facing the insulation member 15 of the other connector 10 when the connectors are in alignment is covered with a disc 23. The disc is made of a flexible or yielding insulation material such as rubber as distinguished from the rigid insulation material preferably used for insulation member 15. To secure disc 23 in its position on insulation member 15, the disc is provided with an annular extension 24 engaging a corresponding annular recess 25 in the face of the insulation member. On the upper or front side of disc 23 there is provided a spigot or collar 26 encompassing contact pin 19. This collar is arranged to engage a corresponding opening 27 in the disc of the other connector when the two connectors are joined. In other words, when contact pin 19 of one connector engages socket 18 of the other connector, the collars 26 will also engage the corresponding openings 27, thereby effectively sealing the contact elements of the connectors against the entrance of moisture, dust, etc. The sealing effected by disc 23 is further improved by providing on the upper side of the disc an annular ring or collar 28 which can be tightly pressed against ring or collar of the disc of the second connector as will be more fully explained hereinafter.

The provision of a disc or sealing washer 23 detachably secured to insulation member 15 has the advantage of greatly extending the useful life of the connectors and with it of the entire cable sections to which the connectors are applied as in practice it is usually not feasible to replace a damaged or worn out connector.

As will be evident, an insulation member made of rigid insulation material such as member 15 will last practically indefinitely unless mechanically damaged. On the other hand, the rigidity of member 15 makes it difficult to seal the interior of the coupling which is very important in many instances as previously explained. The provision of the flexible sealing washer permits to attain such desired sealing connection. However, the use of a washer made of rubber or similar material introduces an element which is subject to deterioration. As it is well known, rubber and similar material is affected by moisture, changes in temperature, etc. and also ages comparatively rapidly. By making the sealing washer exchangeable, the disadvantage of using rubber is eliminated without losing the advantage of a flexible sealing material.

For the purpose of permanently securing the connector and relieving cable pull from the conductors and electrical joints, a substantially cup-shaped metal element 30 is imbedded in sleeve 14 and extended into insulation member 15. Cup 30 is further secured, particularly against pull, by a disc 31 slipped over the inner insulation 32 of wires 20 and 21. Disc 31 and with it cup 30 serve to receive cable pull from the conductors (if an armored cable be used) through the steel wire 33 surrounding insulation 32 and fastened to disc 31 by means of a loop or knot 34.

The means for securing connector 11 to the cable end further comprise a metal sleeve 35 tightly fitted upon insulation member 15 and inserted with its lower end in a corresponding annular recess 36 of sleeve 14, the upper end of sleeve 35 being substantially flush with the upper end of member 15. The walls of sleeve 35 and cup 30 are each provided with two holes. A pin 37 is passed through the four holes thus formed and secured at both ends by two rivet heads 38 and 39 respectively countersunk in corresponding recesses of sleeve 35.

As will be evident, the previously described fastening means secure member 15 and sleeve 35 rigidly to cable sleeve 14 and take the cable pull.

For the purpose of securing connectors 10 and 11 to each other, each connector is provided with an identical screw member generally designated by 40. Each screw member comprises a sleeve portion 41 and a spiral portion 42. Sleeve portion 41 forming an outer sleeve is rotatably mounted upon sleeve 35 forming an inner sleeve. To prevent axial displacement of a screw member on the inner sleeve, sleeve portion 41 is provided with an inwardly extending annular flange 43 engaging a corresponding annular recess 44 on the lower end of sleeve 35 as can best be seen on Fig. 1. Sleeve portion 41 is provided with a knurled section 45 and two openings 46 to allow for access to rivet heads 38 and 39. Each spiral portion 42 is extended beyond the upper edge of the respective insulation member 15 and provided with two open spiral slots 47 and 48 to form screw threads as can best be seen on the upper half of Fig. 1. It will be apparent from this figure that as a result two threads 49 and 50 are formed ending about 180° apart. However, it should be understood that instead of a screw member having a double thread, a screw member having a single thread or more than two threads may also be provided depending upon the desired axial rigidity of the coupling and protection of the contact pins particularly at the tips thereof. The widths of the slots in axial direction are substantially equal to or slightly below the widths of the threads proper in axial direction for reasons which will be more fully explained hereinafter. Furthermore, the total axial depth of the threads of each spiral portion, that is, the distance from the outer ends of the threads to the inner end thereof is slightly in excess of the lengths of the protruding portions of each contact pin 19 for reasons which will also be more fully explained hereinafter.

Each connector is further provided with a locking means. These locking means, generally designated by 55, are shown as comprising a two-arm lever 56 pivotally supported in a slot 57 of sleeve portion 41 by means of a pin 58 inserted into a corresponding hole of sleeve portion 41 as can best be seen on Fig. 3. One arm of the lever 56 is preferably slanted and extended toward cable sleeve 14, as can be seen on the upper half of Fig. 1 so that lever 56 can be pivoted about pin 58. The second arm of the lever is extended toward the spiral portion 42 and arranged to engage a corresponding detent 59 near the tip of each thread as can be best seen on Fig. 2. A spring 60 tends to urge the said second arm of lever 56 into engagement with the respective detent 59.

As can best be seen on Fig. 2, the lever of one connector always coacts with the detent in a thread of the other connector, thereby locking the two connectors together when the levers engage the respective detents. Figs. 1 and 2 furthermore show that the two locking means are displaced circumferentially relative to each other. As a result, the two connectors, when locked, can never be accidentally unlocked when pressure is exerted upon the coupling for instance when a car wheel passes over the coupling since both locking means must be simultaneously actuated for the purpose of unlocking the connectors.

To facilitate the joining of the connectors in a manner more fully described hereinafter, the side 61 of the levers 56 facing the threads is slanted (see Fig. 3) in such direction that the levers will be lifted automatically out of the respective detents when the screw members are rotated relative to each other in the direction for joining the two connectors but will resist relative rotation of the screw members in opposite direction for purpose of separating the connectors.

In the previous specification, reference has been mostly made to connector 11 as this connector is shown in section but it should be clearly understood that connector 10 is symmetrical in all essential respects.

The operation of a coupling according to Figs. 1 to 3, as hereinbefore described, is as follows:

Let it be assumed that it is intended to join the connectors 10 and 11 for the purpose of forming a continuous cable length. The connectors are placed into an aligned position as shown in Fig. 1 and then moved towards each other to bring the threads of one connector into engagement with the threads of the other connector. Since the threads are symmetrical and the axial widths of the slots or spacings between the threads are equal to or slightly below the axial widths of the threads proper, each screw member can either engage or receive the other screw member. In other words, connector 10 can be screwed into connector 11 or connector 11 can be screwed into connector 10. The two connectors are screwed together by rotating screw members 40 relative to each other while the other components of the connectors, particularly member 15 with the contact elements and the conductors proper, remain stationary. The relative rotation of the screw members will force the connectors towards each other thereby causing pin 19 of one connector to enter socket 18 of the other connector. As the contact elements are symmetrical, it will be evident that each connector will fit any other connector, thereby completely eliminating the necessity of reversing a cable section to match connectors.

As the relative rotation of the screw members is continued and the contact pins 19 penetrate deeper into the corresponding sockets 18, collars 26 will finally enter the corresponding recesses 27, and ring 28 of one washer 23 will be pressed against the ring of the other washer thereby effectively sealing the interior of the coupling. At the same time, threads 49 and 50 will supplement each other to form a substantially closed and rigid shell protecting the interior of the coupling as can best be seen on Fig. 2. In this connection it should be mentioned that threads 49 and 50 also serve as protection of pins 19 against damage by impact by reason of encompassing the pins when the connectors are separated, as can best be seen in Fig. 1. As the screw members are pressed one against the other, any dirt in the clearances between threads is squeezed out since these clearances are substantially closed by the screw pressure.

It will be apparent that the sealing washers can be pressed together with substantial pressure thereby effecting a tight sealing by gripping the knurled sections of the screw members. In the event particularly high sealing pressure is desirable, suitable wrenches can be conveniently applied to the screw members. Furthermore, by reason of the fact that the internal parts of the connectors remain stationary and are not subject to any distortion, an additional effective sealing and hence protection of the contact elements are effected at collars or spigots 26. Since the axial depth of the threads is slightly in excess of the lengths of the protruding portion of pins 19, any desired sealing pressure can be attained.

When the connectors are finally moved into joined and sealed positions, each lever 56 is in alignment with the corresponding detent 59 and will engage the same, as shown in Fig. 2, thereby locking the connectors in the said joined and sealed positions. As will be apparent, the employed locking means do not permit any retrograde relative movement of the screw members entailing relaxation of the sealing pressure as do bayonet locks.

For the purpose of separating the two connectors it is merely necessary to lift both locks or catches whereupon the screw members can be unscrewed thereby forcing the contact elements out of engagement.

The modification of the coupling shown in Figs. 4 and 5 is similar to the embodiment as shown in Figs. 1 to 3 inclusive as far as the arrangement of the contact elements and the means for securing the connectors are concerned. The same reference characters are therefore employed to designate identical parts. The modification according to Figs. 4 and 5 is distinguished from Figs. 1 to 3 inclusive by the arrangement of the locking means. While the locking means of Figs. 1 to 3 lock the two connectors in the joined and sealed position only, the locking means of Figs. 4 and 5 secure the two connectors in any selected relative position.

For this purpose, certain portions of the edge of the threads 49 and 50 of each screw member are provided with serrations 65. As a result, the serrations in the threads of one screw member will engage the serrations in the threads of the other screw member when the screw members are screwed together, as shown in Fig. 5, thereby securing the two connectors in any relative position of the screw members in which rotation thereof is discontinued. To permit rotation of the screw members in spite of the resistance offered by the serrations engaging each other, a limited clearance 66 is provided between certain portions of the threads as can best be seen on Fig. 5, thereby providing for a limited displacement of the threads in axial direction so that the thread portions including the serrations can yield in axial directions when the screw members are rotated relative to each other. Furthermore, the tips of each thread are shortened relative to the ends of the slots 47 and 48 thus facilitating the exertion of the desired sealing pressure.

The locking means according to Figs. 4 and 5 have the advantage that the sealing pressure can be varied by pulling the screw members more or less tightly together to compensate for shrinkage or settling of sealing washers 23.

Fig. 6 shows another modification of the coupling connectors. As will appear from a comparison of Fig. 6 and connector 11 of Figs. 1 and 2 the connector of Fig. 6 is similar to the connector of Fig. 1 in all respects with the exception that the rigid insulation member 15 and the detachable flexible sealing washer 23 are replaced by an extension 70 of the cable insulation. In other words, the ends portion 70 of the cable insulation serves as support for the contact elements proper and also as support for the inner sleeve 35 tightly fitted upon insulation portion 70. To secure socket 18 and pin 19 in their positions within the flexible insulation material, usually rubber, a distance disc 22 made of rigid insulation material is provided.

The operation of the connector according to Fig. 6 will be obvious from the previous explanations. It will further be obvious that the insulation material of the cable will not experience any distortion when the connector according to Fig. 6 is screwed together with the other symmetrical connector of the coupling as only the screw members are rotated relative to each other while the insulation material and the contact elements supported thereon remain stationary.

The face of the insulation portion 70 is shaped similar to the upper side of the disc 23 so that is will form a sealing portion to be pressed against the corresponding sealing element of the other connector when two connectors are screwed together.

As previously mentioned, the connector of Fig. 6 can be screwed together with a similar connector to form a coupling. However, the connector can also be screwed together with a connector according to Fig. 1. In other words, the connectors of Figs. 1 and 6 are exchangeable.

The connector according to Figs. 4 and 5 can also be designed similar to the connector of Fig. 6 in regard to the insulation material.

In this connection it should be mentioned that detents 59 may also be provided in the threads of the connectors of Figs. 4 and 5 in which case all illustrated connector modifications are freely exchangeable.

While the invention has been described in detail with respect to certain now preferred examples and embodiments of the invention it will be understood by those skilled in the art after understanding the invention, that various changes and modifications may be made without departing from the spirit and scope of the invention and it is intended therefore, to cover all such changes and modifications in the appended claims.

What is claimed as new and desired to be secured by Letters Patent is:

1. An electrical coupling for detachably connecting conductor ends including a pair of symmetrical connector members, each connector comprising engaging and receiving contact elements connected to the respective conductors and each arranged to engage and receive a corresponding contact element on the other connector, each connector further comprising an insulation member supporting the respective contact elements, the portions of the insulation members facing each other when the connectors are joined constituting sealing portions, and a screw member rotatably supported on the insulation member, each screw member having a plurality of self-supporting spaced threads engageable with the threads of the screw member of the other connector, each two adjacent threads of one screw member being adapted to receive a thread of the other screw member therein between so as to form a substantially closed sleeve with flush wall encompassing the insulation members and to secure the connectors to each other with the contact elements of the connectors in engaging and receiving positions respectively and with the sealing portions pressed one against the other for sealing the interior of the coupling.

2. An electrical coupling for detachably connecting conductor ends including a pair of symmetrical connector members, each connector comprising engaging and receiving contact elements connected to the respective conductor and each arranged to engage and receive a corresponding contact element on the other conductor, each connector further comprising an insulation member supporting the respective contact elements, a flexible sealing member at the end of the insulation member in a position facing the sealing member of the other connector when the connectors are joined, and a screw member rotatably supported on the insulation member and constructed to be screwed together with the screw member of the other connector so as to secure the connectors to each other with the contact elements in engaging and receiving positions respectively and with the sealing members pressed one against the other for sealing the interior of the coupling, each of said screw members comprising a sleeve portion rotatably mounted on the respective insulation member co-axially therewith and a spiral portion forming several self-supporting spaced screw threads and extending from the sleeve portion coaxially therewith and beyond the sealing member, the axial spacings between threads of each spiral portion and the axial width of the thread material proper being of a relationship so as to cause the spiral portion of one connector either to engage or to receive the spiral portion of the other connector and to form a substantially closed sleeve with flush wall when the said screw members are rotated relative to each other for the purpose of joining the connectors.

3. An electrical coupling as described in claim 2, wherein the total axial depth of the threads of each of the spiral portions axially protruding beyond the respective sealing member is in excess of the axial length of the protruding portions of the engaging contact elements so as to cause a slight axial contraction of the thread spacings when the connectors are screwed together, thereby effecting a sealing pressure between said two sealing members.

4. An electrical coupling as described in claim 2, in combination with locking means supported on said connectors and arranged to lock the said screw members against relative rotation, thereby securing the connectors in joined position.

5. An electrical coupling as described in claim 2, wherein each connector additionally comprises a locking element supported on the screw member, each of said screw members including a detent in its outer wall, said locking elements and said detents being positioned so that the locking element of one connector is in alignment with the respective detent of the other connector when the connectors are in joined and sealed positions, thereby causing each locking element to engage the respective detent for locking the connectors in the said joined and sealed positions, one of the locking elements and the detent coacting therewith being circumferentially displaced relative to the other locking element and the detent coacting therewith.

6. An electrical coupling for detachably connecting the conductors of two insulated cables, said coupling including a pair of symmetrical connector members, each connector comprising engaging and receiving contact elements connected to the respective conductor and each arranged to engage and receive a corresponding contact element on the other connector, each connector further comprising a substantially cylindrical insulation member rigidly secured on one end to the insulation of one of the cables and supporting the respective contact elements, a sealing member on the insulation member detachably secured to the other end thereof, an inner sleeve tightly fitted upon the cylindrical wall of the insulation member, and a screw member arranged to be screwed together with the screw member of the other connector so as to secure the connectors to each other with the contact elements of the connectors in engaging and receiving positions respectively and with the sealing members pressed one against the other for sealing the interior of the coupling, each of said screw members comprising an outer sleeve rotatably mounted on the inner sleeve and a spiral portion forming several self-supporting spaced screw threads and extending from the outer sleeve co-axially therewith and beyond the sealing member, the axial spacings between threads of each spiral portion and the axial width of the thread material proper being of a relative width so as to cause the spiral portion of one connector either to engage or to receive the spiral portion of the other connector and to form a substantially closed sleeve when the said screw members are rotated relative to each other for the purpose of joining the connectors.

7. An electrical coupling as described in claim 6, wherein a substantially cup-shaped member is embedded in the insulation of each cable and extended into the body of said respective insulation member, the inner sleeve, the insulation member and the cup-shaped member of each connector having holes therethrough disposed in alignment one with the other, and wherein a securing pin is passed through said holes for securing the insulation member and the inner sleeve of each connector to the respective cable insulation.

8. An electrical coupling as described in claim 6, wherein said outer sleeve rotatably mounted on the inner sleeve is provided with an inwardly extending flange, and wherein said inner sleeve is provided with an annular recess engaged by said flange to prevent axial displacement of the outer sleeve relative to the inner sleeve.

9. A coupling for detachably connecting the ends of two electric conductors, including a pair of symmetrical members, each connector comprising engaging and receiving contact elements connected to the respective conductor and each arranged to engage and receive a corresponding contact element on the other connector, each connector further comprising an insulation member supporting the respective contact elements, the face portions of the insulation members having flexible sealing portions thereon, and a substantially sleeve shaped screw member rotatably supported on each insulation member and engageable one with the other, each screw member including self-supporting spaced helical threads, each two adjacent threads of one member being adapted to receive a thread of the other member therein-between, said insulation members being arranged to engage each other with the said sealing portions in response to a preliminary rotation of the engaged screw members relative to each other and to be moved into a relative axial position in which the sealing portions are pressed against each other in response to a final relative rotation of the screw members causing compression of said sealing portions, thereby joining the connectors with said sealing portions in sealing engagement, the said engaged threads forming a substantially closed sleeve with flush wall.

10. A coupling for detachably connecting the ends of two electric conductors, including a pair of symmetrical members, each connector comprising engaging and receiving contact elements connected to the respective conductor and each arranged to engage and receive a corresponding contact element on the other connector, each connector further comprising an insulation member supporting the respective contact elements, the face portions of the insulation members having yieldable sealing portions thereon, and a substantially sleeve shaped screw member rotatably supported on each insulation member and engageable one with the other, each screw member including self-supporting spaced helical threads springy in axial direction, each two adjacent threads of one screw member being adapted to receive the thread of the other screw member therebetween, the axial spacing between each two adjacent threads of each screw member being slightly in excess of the axial width of the threads, edge portions of said threads facing each other when the screw members are screwed together including serrations arranged to engage each other, said insulation members being arranged to engage each other with the said sealing portions in response to a preliminary rotation of the engaged screw members relative to each other and to be moved into a relative axial position in which the sealing portions are pressed against each other in response to a final relative rotation of the engaged screw members causing axial deformation of the threads within the limits of said excess axial spacing and compression of said sealing portions, thereby joining the connectors with said yieldable portions in sealing engagement, said serrated edge portions securing the screw members in their relative final position, the said engaged threads forming a substantially closed sleeve with flush wall.

11. A coupling as described in claim 10, wherein the relative axial width of the thread spacings and of the threads proper is selected to provide for engagement of the serrated edge portions of the threads and for spacing of smooth edge portions of the threads facing each other when the two screw members are threaded one into the other to permit axial yielding of the threads, thereby permitting sliding relative movement of said serrated thread portions for moving said insulation members into a relative position compressing said sealing portions.

HENRY J. MODREY.

REFERENCES CITED

The following references are of record in the file of this patent:

UNITED STATES PATENTS

| Number | Name | Date |
|---|---|---|
| 52,958 | Briggs | Mar. 6, 1866 |
| 367,931 | Runels | Aug. 9, 1887 |
| 482,306 | Hall | Sept. 6, 1892 |
| 1,027,267 | Mendel | May 21, 1912 |
| 1,151,851 | Babos | Aug. 31, 1915 |
| 1,954,051 | Moon | Apr. 10, 1934 |
| 2,014,853 | Ley et al. | Sept. 17, 1935 |
| 2,124,207 | Neeson | July 19, 1938 |
| 2,231,124 | Joseph | Feb. 11, 1941 |
| 2,247,386 | John | July 1, 1941 |
| 2,337,618 | Miller | Dec. 28, 1943 |
| 2,379,942 | Webber | July 10, 1945 |
| 2,384,267 | Andersen | Sept. 4, 1945 |
| 2,386,177 | Andersen | Oct. 9, 1945 |
| 2,396,872 | Miller et al. | Mar. 19, 1946 |
| 2,409,650 | Wiggins | Oct. 22, 1946 |
| 2,421,155 | Miller et al. | May 27, 1947 |
| 2,440,279 | Larkins Jr. | Apr. 27, 1948 |

FOREIGN PATENTS

| Number | Country | Date |
|---|---|---|
| 102,071 | Austria | Sept. 30, 1937 |
| 693,052 | Germany | July 1, 1940 |